(12) United States Patent
Williams

(10) Patent No.: US 8,443,608 B2
(45) Date of Patent: May 21, 2013

(54) FEED ARM FOR A MULTIPLE CIRCUIT FUEL INJECTOR

(75) Inventor: Brandon Phillip Williams, Urbandale, IA (US)

(73) Assignee: Delavan Inc, West Des Moines, IA (US)

( * ) Notice: Subject to any disclaimer, the term of this patent is extended or adjusted under 35 U.S.C. 154(b) by 832 days.

(21) Appl. No.: 12/072,356

(22) Filed: Feb. 26, 2008

(65) Prior Publication Data

US 2009/0211256 A1    Aug. 27, 2009

(51) Int. Cl.
*F02C 1/00* (2006.01)
*F02G 3/00* (2006.01)

(52) U.S. Cl.
USPC .............................................. 60/740; 60/742

(58) Field of Classification Search
USPC .................................................... 60/740, 742
See application file for complete search history.

(56) References Cited

U.S. PATENT DOCUMENTS

| | | | | |
|---|---|---|---|---|
| 4,735,044 | A * | 4/1988 | Richey et al. | 60/742 |
| 5,570,580 | A * | 11/1996 | Mains | 60/747 |
| 5,983,642 | A | 11/1999 | Parker et al. | |
| 6,915,638 | B2 | 7/2005 | Runkle et al. | |
| 7,043,922 | B2 * | 5/2006 | Thompson et al. | 60/772 |
| 2007/0068164 | A1 | 3/2007 | Hernandez et al. | |

FOREIGN PATENT DOCUMENTS

| | | |
|---|---|---|
| EP | 1 245 900 A2 | 10/2002 |
| EP | 2182290 A1 | 5/2010 |
| GB | 2 410 321 A | 7/2005 |
| WO | WO 01/40710 A1 | 6/2001 |

OTHER PUBLICATIONS

UK Search Report dated Jun. 22, 2009.
United Kingdom examination report dated Nov. 15, 2011 issued on United Kingdom Application No. GB 0903079.2.
United Kingdom combined Search and Examination Report dated Jun. 27, 2012 issued in United Kingdom Patent Application No. GB1208944.7.

* cited by examiner

*Primary Examiner* — Phutthiwat Wongwian
*Assistant Examiner* — Craig Kim
(74) *Attorney, Agent, or Firm* — Edwards Wildman Palmer LLP; Scott D. Wofsy; Joshua L. Jones

(57) ABSTRACT

A feed arm for a multiple circuit fuel injector of a gas turbine engine. The feed arm includes an elongated tubular sleeve having a central bore with an interior wall defining an inner diameter, and an elongated fuel tube positioned within the bore of the tubular sleeve. The fuel tube includes a tubular wall defining an outer diameter, which is substantially equal to the inner diameter of the central bore. A primary fuel flow passage is formed within the tubular wall of the fuel tube and bounded by the interior wall of the tubular sleeve, and the primary fuel flow passage circumferentially extends around the fuel tube at least once along the axial length of the fuel tube. A secondary fuel flow passage extends through a central portion of the fuel tube, and the fuel tube is configured to facilitate heat transfer by conduction and/or convection.

14 Claims, 2 Drawing Sheets

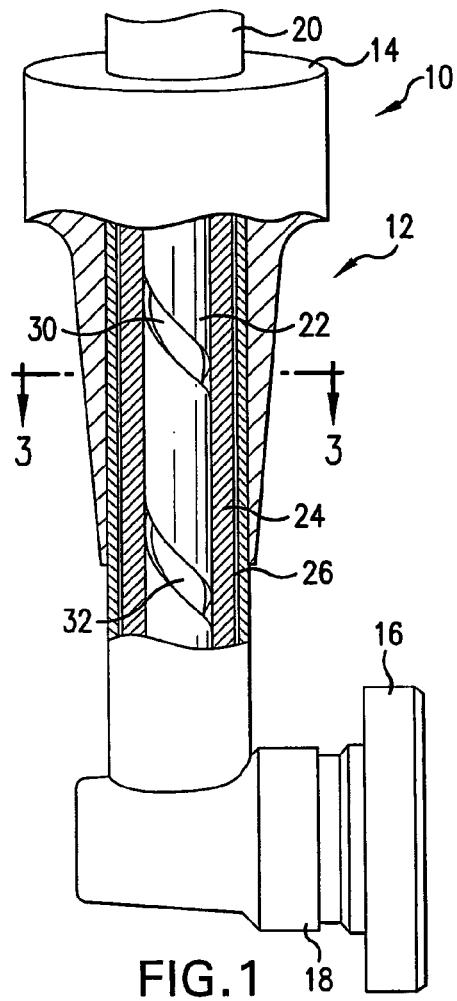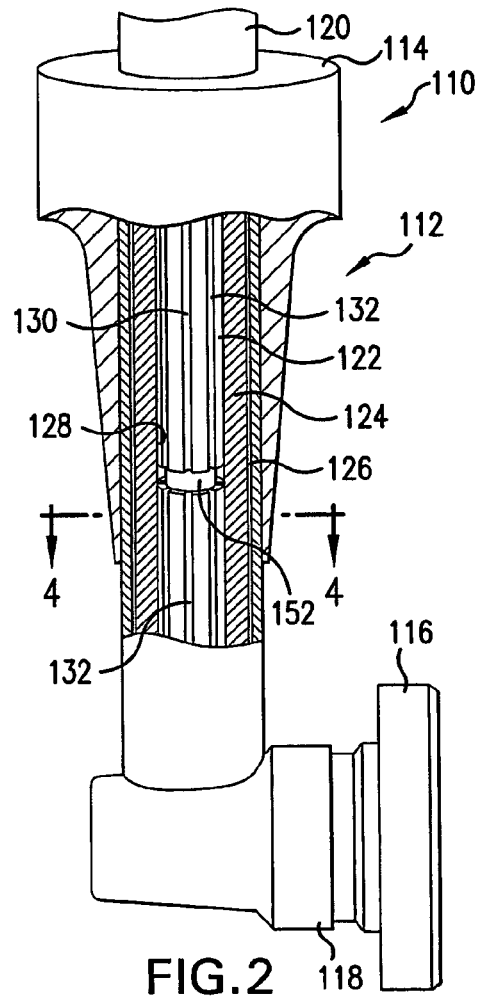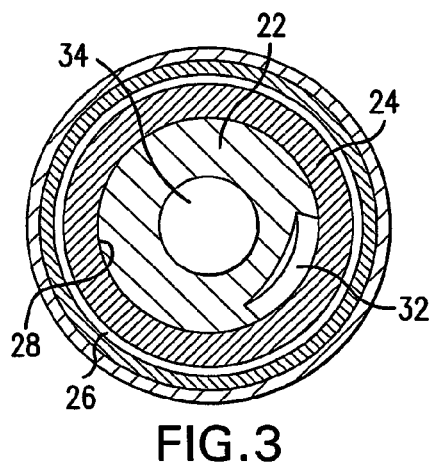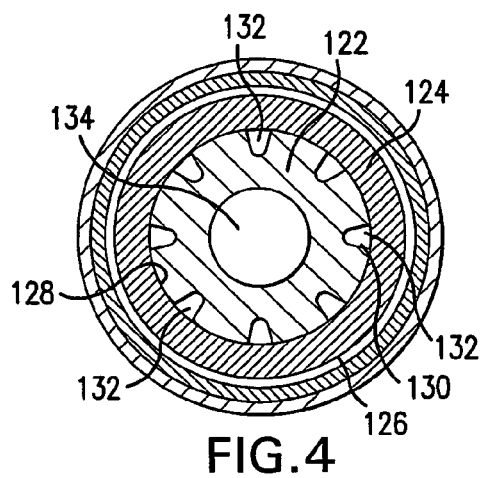

FEED ARM FOR A MULTIPLE CIRCUIT FUEL INJECTOR

BACKGROUND OF THE INVENTION

1. Field of the Invention

The present invention relates to fuel injectors, and more particularly, to a feed arm for a multiple circuit fuel injector of a gas turbine engine.

2. Description of Related Art

Fuel injectors in gas turbine engines direct pressurized fuel from a manifold into one or more combustion chambers. Fuel injectors also function to prepare the fuel for mixing with air prior to combustion. Each injector typically includes an inlet near the manifold, one or more tubular fuel passages, and an outlet connected to a spray nozzle for introducing atomized fuel into a combustion chamber. The atomized fuel is then typically mixed with air and ignited, and the resulting expanded gas causes a plurality of turbine blades to rotate, thus providing power for propelling an aircraft or for other applications.

Many fuel injectors include multiple fuel flow passages, allowing for the power output of the gas turbine engine to be more easily adjusted. For example, a fuel injector may have a primary fuel flow passage and a secondary fuel flow passage, with both passages being used during higher power operation and only the primary fuel flow passage being used during lower power operation.

Fuel injectors also typically include heat shields surrounding the tubular fuel passages to protect the fuel flowing through the passages from the extreme heat generated in the combustion chamber. These heat shields are necessary to prevent coking, the breaking down of the liquid fuel into solid deposits. Coking is likely to occur when the temperature of the wetted walls in a fuel passage exceeds a maximum value. When coking occurs, solid deposits can form within the fuel flow passage, which restricts the flow of fuel through the passage and can render the fuel injector ineffective or unusable.

Conventional multiple circuit fuel injectors include a tubular member with primary and secondary fuel flow passages. The primary fuel flow passage is formed through a central portion of the tubular member, and the secondary fuel flow passage is formed surrounding the primary fuel flow passage. Fuel flows continuously through the primary fuel flow passage, however fuel may flow only intermittently through the secondary fuel flow passage. Depending on the operational requirements of the engine, the velocity of the fuel flow through the secondary passage may be decreased, or the flow may be stopped altogether. As a result, stagnate fuel may be present in the secondary fuel flow passage. Because the secondary fuel flow passage has a reduced fuel velocity, and because the secondary fuel flow passage is in close proximity to the extreme heat generated by the combustion chamber, coking of the fuel within the secondary fuel flow passage is a common problem.

Thus, there is a need for improved methods and systems for preventing coking in both primary and secondary fuel flow passages of fuel injectors for gas turbine engines.

SUMMARY OF THE INVENTION

Advantages of the present invention will be set forth in and become apparent from the description that follows. Additional advantages of the invention will be realized and attained by the devices and methods particularly pointed out in the written description and claims, as well as from the appended drawings.

To achieve these and other advantages and in accordance with the purpose of the invention, as embodied herein, a feed arm for a multiple circuit fuel injector of a gas turbine engine is provided. The feed arm includes an elongated tubular sleeve having a central bore with an interior wall defining an inner diameter, and an elongated fuel tube positioned within the bore of the tubular sleeve. The fuel tube includes a tubular wall defining an outer diameter, which is substantially equal to the inner diameter of the central bore. A primary fuel flow passage is formed within the tubular wall of the fuel tube and bounded by the interior wall of the tubular sleeve, and the primary fuel flow passage circumferentially extends around the fuel tube at least once along the axial length of the fuel tube. A secondary fuel flow passage extends through a central portion of the fuel tube, and the fuel tube is configured to facilitate heat transfer between the primary fuel flow passage and the secondary fuel flow passage by means of conduction and/or convection.

A method of forming a feed arm for a multiple circuit fuel injector of a gas turbine engine is also provided. The method of forming a feed arm for a multiple circuit fuel injector of a gas turbine engine, the method includes the steps of providing a fuel tube having a tubular wall, a central passage, and an outer diameter, forming a fuel flow passage in the tubular wall of the fuel tube such that the fuel flow passage circumferentially wraps around the fuel tube at least once along the axial length of the fuel tube, providing an elongated tubular sleeve having a central bore defining an inner diameter, the inner diameter being substantially equal to the outer diameter of the fuel tube; and positioning the fuel tube within the central bore of the tubular sleeve.

These and other features and benefits of the multiple circuit fuel injector according to the present invention, as well as the manner in which the invention is assembled and employed will become more readily apparent to those having ordinary skill in the art from the following enabling description of the preferred embodiments taken in conjunction with the several drawings described below.

BRIEF DESCRIPTION OF THE DRAWINGS

So that those skilled in the art to which the subject invention appertains will readily understand how to make and use the multiple circuit fuel injector of the subject invention without undue experimentation, preferred embodiments thereof will be described in detail below with reference to certain figures, wherein:

FIG. 1 is a side elevation view in partial cross-section of a fuel injector constructed in accordance with an exemplary embodiment of the present invention, showing a helical outer fuel passage surrounding an inner fuel passage;

FIG. 2 is a side elevation view in partial cross-section of a fuel injector constructed in accordance with another exemplary embodiment of the present invention, showing a plurality of axial outer fuel passages connected by a central annular passage;

FIG. 3 is a cross-sectional view taken along line 3-3 of FIG. 1 illustrating the inner fuel passage and a portion of the outer helical fuel passage;

FIG. 4 is a cross-sectional view taken along line 4-4 of FIG. 2 illustrating the inner fuel passage and the axial outer fuel passages;

DETAILED DESCRIPTION OF THE PREFERRED EMBODIMENTS

Figure 5:
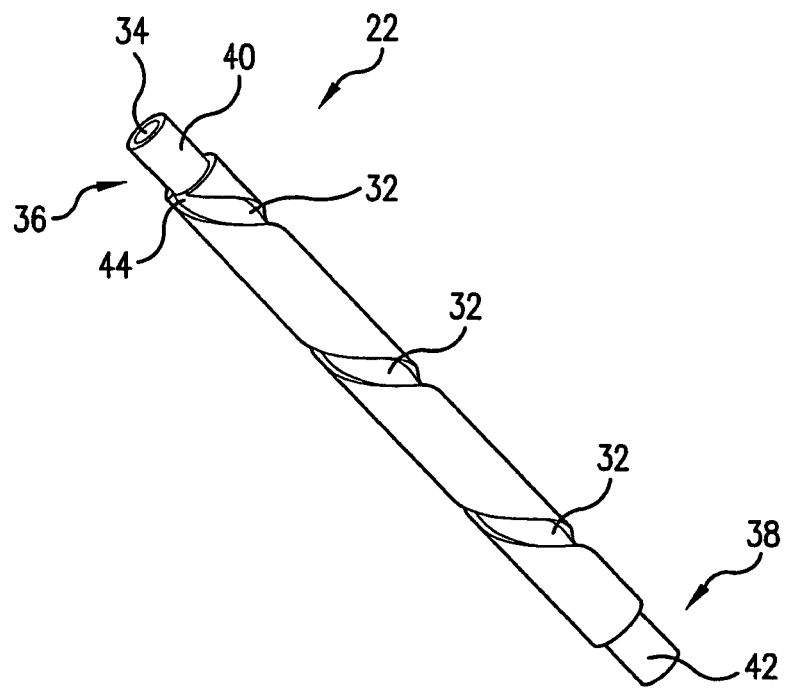
FIG. 5 is a perspective view of a fuel tube in which the outer and inner fuel flow passages are formed according to the exemplary embodiment shown in FIG. 1.

Referring now to the drawings, wherein like reference numerals identify or otherwise refer to similar structural features or elements of the various embodiments of the subject invention, there is illustrated in FIGS. 1, 3, and 5, an exemplary embodiment of a multiple circuit fuel injector designated generally by reference character 10. Other embodiments of the fuel injector are provided in FIGS. 2, 4, and 6, as will be described. Reference will now be made in detail to the present preferred embodiments of the invention, examples of which are illustrated in the accompanying drawings.

The subject invention is directed to a new and useful method of forming multiple fuel flow passages in a fuel injector, primarily for use in a gas turbine engine. A primary fuel passage of the subject invention is formed in the outer portion of a tubular structure and has a decreased cross-sectional area when compared to conventional fuel passages. This decreased cross-sectional area increases the fuel flow velocity and therefore the convective heat transfer coefficient (HTC). This increase in HTC lowers the localized wetted wall temperature for the fuel passage, which helps prevent coking of the fuel within the fuel injector.

As shown in FIG. 1, fuel injector 10 includes an elongated stem or feed arm 12. A mounting flange (not shown) may be provided at the upstream end portion 14 of feed arm 12 to enable fuel injector 10 to be fastened to a wall of the combustion chamber of a gas turbine engine in a conventional manner. A nozzle assembly 16 is provided at a downstream end portion 18 of feed arm 12. Nozzle assembly 16 delivers atomized fuel to the combustion chamber.

A fuel inlet 20 is formed near the upstream end portion 14 of fuel injector 10. Fuel inlet 20 receives fuel from a fuel pump (not shown) associated with the engine at a given flow rate and temperature. The fuel inlet 20 communicates with an elongated fuel tube 22, which is surrounded by an outer tubular sleeve 24. Outer tubular sleeve 24 includes an exterior wall 26 and a bore running through a central portion of the tubular sleeve forming an interior wall 28. The outer diameter of tubular sleeve 24 is chosen such that it will be only slightly larger than the outer diameter of elongated fuel tube 22, so that fuel tube 22 fits inside the bore of tubular sleeve 24. In one exemplary embodiment, fuel tube 22 is press-fit into the bore of tubular sleeve 24.

A primary fuel flow passage 30 is formed within elongated fuel tube 22. In one exemplary embodiment, primary fuel flow passage 30 extends circumferentially around fuel tube 22 at least once along the axial length of fuel tube 22. Interior wall 28 of tubular sleeve 24 bounds primary fuel flow passage 30 and forms a portion of the wall of primary fuel flow passage 30.

Primary fuel flow passage 30 may include one or more helical channels formed within fuel tube 22 and wrapping around fuel tube 22 one or more times. An exemplary embodiment of a fuel injector 10 having a helical fuel flow channel 32 is shown in FIGS. 1 and 3. The pitch of the helical channel 32 can be selected to control the desired flow velocity through the channel. The pitch of helical channel 32 is the distance that the channel extends along the longitudinal axis of feed arm 12 during one complete revolution of the helical channel. Those skilled in the art will readily appreciate that when other parameters are held constant, increasing the pitch of the helical channel will produce lower fuel flow velocities in the primary fuel flow passage, while increasing the pitch of the helical channel will produce higher fuel flow velocities in the primary fuel flow passage.

The width of the helical channel 32 can be selected or otherwise designed to obtain a desired fuel flow velocity for the fuel injector of the subject invention. This flexibility gives the nozzle designer more control over the pressure drop through the injector without having to sacrifice the gains in flow velocities and heat transfer coefficients achieved by decreasing the available fuel flow area in the primary passage in accordance with the methodology of the subject invention.

As shown in FIG. 3, a secondary fuel flow passage 34 is formed in a central portion of fuel tube 22 and extends along the axial length of the fuel injector 10. In one exemplary embodiment, secondary fuel flow passage 34 is a cylindrical hollow passage or bore extending through a central interior portion of fuel tube 22. Fuel tube 22 is configured to facilitate heat transfer between primary fuel flow passage 30 and secondary fuel flow passage 34 by means of both conduction and convection. In one exemplary embodiment, fuel tube 22 is constructed from a material having high thermal conductivity to facilitate heat transfer between primary fuel flow passage 30 and secondary fuel flow passage 34. For example, fuel tube 22 may be constructed from any number of metal alloys known in the art to possess high thermal conductivity. However, one having skill in the art will appreciate that a wide variety of materials having suitable thermal conductivity could be used to construct fuel tube 22. In conventional designs of multiple circuit fuel injectors, the primary and secondary fuel flow passages are often formed using concentric tubes. Advantageously, forming the primary fuel flow passage 30 and the secondary fuel flow passage 34 from a single fuel tube 22 eliminates the need to compensate for different thermal expansion rates between the two concentric tubes, as is necessary in conventional multiple circuit fuel injectors.

Referring to FIG. 5, fuel tube 22 is shown without the surrounding outer tubular sleeve 24 and the associated structure of fuel injector 10. Fuel tube 22 includes an upper end 36 and a lower end 38 having a reduced circumference and forming an upper chamber 40 and a lower chamber 42 that form a part of the primary fuel flow passage 30. The exterior walls of upper chamber 40 and lower chamber 42 are formed by outer tubular sleeve 24. During operation of fuel injector 10, fuel flows from fuel inlet 20 into upper chamber 40 and into helical channel 32 through a channel entrance 44. Fuel flows continuously through helical channel 32, while fuel flows intermittently through the secondary fuel passage 34 formed in the bore of fuel tube 22. As fuel flows through helical channel 32, heat is transferred between the helical channel 32 and the secondary fuel flow passage 34 by both conduction and convection. At the lower end 38 of fuel tube 22, the fuel flowing in the primary fuel flow passage 30 exits helical channel 32 and passes through lower chamber 42 before entering nozzle assembly 16. Fuel flowing in secondary fuel flow passage 34 also flows into nozzle assembly 16. Nozzle assembly 16 then atomizes the fuel and introduces it into the combustion chamber of the gas turbine engine.

In one exemplary embodiment, primary fuel flow passage 30 provides a continuous flow of fuel during operation of the gas turbine engine. The fuel flow velocity may be varied depending on the power requirements during each phase of operation of the engine. By contrast, the flow of fuel in secondary fuel flow passage 34 is non-continuous, that is, fuel flows through secondary fuel flow passage 14 only during certain operations requiring an increase in power from the engine. Consequently, the fuel in secondary fuel flow passage may be moving very slowly or not at all.

In conventional multiple circuit fuel injectors, the low fuel flow velocity through the secondary fuel flow passage is often insufficient to properly transfer heat away from the secondary fuel flow passage and prevent coking of the fuel within the fuel passage. The concentric tubes of conventional multiple circuit fuel injectors typically utilized an inner tube passage to form the primary fuel passage and an outer annular passage formed by the outer tube inner diameter and the inner tube outer diameter. This conventional design may be inadequate because the wall temperature of the fuel in the secondary passage may exceed the limits of the fuel, which can lead to coking.

Fuel injector 10 remedies the deficiencies of these conventional designs in two ways. First, secondary fuel flow passage 34 is formed in the central bore of fuel tube 22, and so is isolated from the high temperatures present in the combustion chamber and surrounding environment. In addition, primary fuel flow passage 30 surrounds secondary fuel flow passage 34. The constant flow of fuel in primary fuel flow passage 30 is sufficient to prevent coking in the primary fuel flow passage, and at the same time allows heat to be transferred from secondary fuel flow passage 34 to primary fuel flow passage 30 by way of convection. In one exemplary embodiment, primary fuel flow passage 30 and secondary fuel flow passage 34 are further protected from the heat of the combustion chamber by outer tubular sleeve 24, which includes a thermal insulating material.

Figure 6:
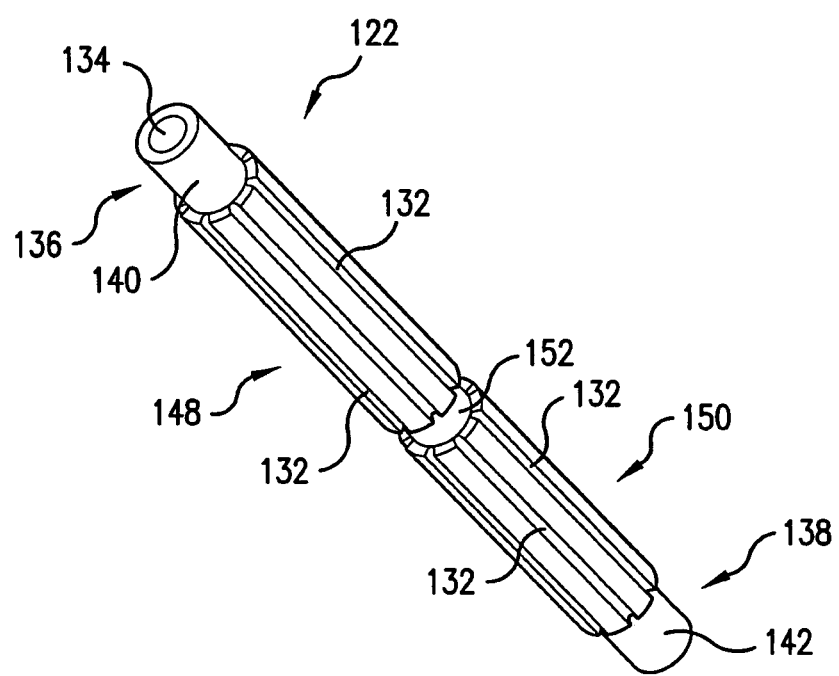
FIG. 6 is a perspective view of a fuel tube in which the outer and inner fuel flow passages are formed according to the exemplary embodiment shown in FIG. 2.

Another exemplary embodiment of a fuel injector according to the subject invention is shown in FIGS. 2, 4, and 6 and designated generally by the numeral 110. As shown in FIG. 2, fuel injector 110 includes an elongated stem or feed arm 112, an upstream end portion 114, and a nozzle assembly 116 provided at a downstream end portion 118 of feed arm 112. These elements of fuel injector 110 are similar to the elements described above regarding the exemplary embodiment shown in FIG. 1.

A fuel inlet 120 is formed near the upstream end portion 114 of fuel injector 110. Fuel inlet 120 receives fuel from a fuel pump (not shown) associated with the engine at a given flow rate and temperature. The fuel inlet 120 communicates with an elongated fuel tube 122, which is surrounded by an outer tubular sleeve 124. Outer tubular sleeve 124 includes an exterior wall 126 and a bore running through a central portion of the tubular sleeve forming an interior wall 128. The outer diameter of tubular sleeve 124 is chosen such that it will be only slightly larger than the outer diameter of elongated fuel tube 122, so that fuel tube 122 fits inside the bore of tubular sleeve 124. In one exemplary embodiment, fuel tube 122 is press-fit into the bore of tubular sleeve 124.

A primary fuel flow passage 130 is formed within elongated fuel tube 22. In one exemplary embodiment, primary fuel flow passage 130 extends circumferentially around fuel tube 122 at least once along the axial length of fuel tube 122. Interior wall 128 of tubular sleeve 124 bounds primary fuel flow passage 130 and forms a portion of the wall of primary fuel flow passage 130.

Primary fuel flow passage 130 includes a plurality of circumferentially spaced axial channels 132 extending along the axial length of the fuel tube. The plurality of axial channels may be divided into an upper portion 148 and a lower portion 150. Upper portion 148 and lower portion 150 may each include a plurality of axial channels 132 connected by a central annular channel 152. Central annular channel 152 may have a width (as measured along the axial length of feed arm 112) that is greater that the width (as measured in a direction perpendicular to the axial length of feed arm 112) of the individual axial channels 132. In one exemplary embodiment, the width of central annular channel 152 is at least twice the width of the individual axial channels 132.

As shown in FIG. 4, a secondary fuel flow passage 134 is formed in a central portion of fuel tube 122 and extends along the axial length of the fuel injector 110. In one exemplary embodiment, secondary fuel flow passage 134 is a cylindrical hollow passage or bore extending through a central interior portion of fuel tube 122. Fuel tube 122 is configured to facilitate heat transfer between primary fuel flow passage 130 and secondary fuel flow passage 134 by means of both conduction and convection.

Axial channels 132 may be equidistantly spaced about the cylindrical hollow portion forming the secondary fuel flow passage 134, as shown in FIG. 4. Other arrangements of the axial channels are also contemplated by the present disclosure. In one exemplary embodiment, axial channels 132 of upper portion 148 may be aligned with axial channels 132 of lower portion 150. In another exemplary embodiment, the axial channels may be offset. Axial channels 132 may also be arranged in a non-symmetrical manner about the central portion of fuel tube 122, and may be spaced non-uniformly around secondary fuel flow passage 134. Fuel tube 122 may include a plurality of annular channels similar to central annular channel 152.

Referring to FIG. 6, fuel tube 122 is illustrated as used in the exemplary embodiment of fuel injector 110. In this view, fuel tube 122 is shown without the outer tubular sleeve 124 and surrounding structure of fuel injector 110. Fuel tube 122 includes an upper end 136 and a lower end 138 having a reduced circumference and forming an upper chamber 140 and a lower chamber 142 that form a part of primary fuel flow passage 130. The exterior walls of upper chamber 140 and lower chamber 142 are formed by outer tubular sleeve 124. During operation of fuel injector 110, fuel flows from fuel inlet 120 through upper chamber 140 and into the plurality of axial channels 132 of upper portion 148 of fuel tube 122. Fuel then flows from axial channels 146 of upper portion 148 into central annular channel 152. From central annular channel 152, the fuel flows into axial channels 132 of the lower portion 150 of fuel tube 122, through lower chamber 142, and into nozzle assembly 116 where it is atomized and introduced into the combustion chamber of the gas turbine engine. As fuel flows through the axial channels 132 and other portions of primary fuel flow passage 130, heat is transferred between the primary fuel flow passage 130 and secondary fuel flow passage 134 by both conduction and convection.

A method of forming a feed arm for a multiple circuit fuel injector of a gas turbine engine is also provided by the present disclosure. The method includes providing the elongated outer tubular sleeve 24 having a central bore defining an inner diameter formed by the interior wall 28 of the tubular sleeve 24. A fuel tube 22 sis also provided and includes one or more fuel flow passages, such as the helical fuel flow passages 32 shown in FIG. 1 and the hollow cylindrical passage illustrated in FIG. 3. Fuel tube 22 is then positioned within the central bore of outer tubular sleeve 24. To produce the helical channel 32 forming primary fuel flow passage 30, the outer diameter of fuel tube 22 is machined to create the helical path about the circumference of the outer fuel tube. In one exemplary embodiment, helical channel 32 is formed by a machining process, such as by turning fuel tube 22 on a lathe or a screw machine. In another exemplary embodiment, the helical channel is formed by electronic discharge machining (EDM). In yet another embodiment, the fuel flow passages in fuel tube 22 are formed by a casting process. Similarly, axial fuel channels 132 and central annular channel 152, as described above can be formed by machining, casting, or by other processes known in the art.

The devices and methods of the present invention, as described above and shown in the drawings, provide for a multiple circuit fuel injector for a gas turbine engine that prevents coking and allows for greater control of fuel flow velocity. It will be apparent to those skilled in the art that various modifications and variations can be made in the devices and systems of the present invention without departing from the scope of the invention as set forth in the appended claims and their equivalents.

What is claimed is:

1. A feed arm for a multiple circuit fuel injector of a gas turbine engine, the feed arm comprising:
    (a) an elongated tubular sleeve having a central bore with an interior wall defining an inner diameter;
    (b) an elongated fuel tube positioned within the bore of the tubular sleeve, the fuel tube having a tubular wall defining an outer diameter, wherein the outer diameter of the fuel tube is substantially equal to the inner diameter of the central bore;
    (c) a helical primary fuel flow passage formed in the tubular wall of the fuel tube and bounded by the interior wall of the tubular sleeve, the helical primary fuel flow passage extending along the majority of the axial length of the fuel tube and circumferentially extending around the fuel tube at least once along the axial length of the fuel tube; and
    (d) a secondary fuel flow passage extending through a central portion of the fuel tube.

2. The feed arm of claim 1, wherein the fuel tube is configured to facilitate heat transfer between the primary fuel flow passage and the secondary fuel flow passage by means of conduction.

3. The feed arm of claim 1, wherein the fuel tube is configured to facilitate heat transfer between the primary fuel flow passage and the secondary fuel flow passage by means of convection as fuel flows through the primary fuel flow passage.

4. The feed arm of claim 1, wherein the primary fuel flow passage has a pitch selected to produce a desired fuel flow velocity at a given fuel flow rate.

5. The feed arm of claim 1, wherein the sleeve is a thermal insulating sleeve.

6. A method of forming a feed arm for a multiple circuit fuel injector of a gas turbine engine, the method comprising the steps of:
    (a) providing a fuel tube having a tubular wall, a central passage, and an outer diameter;
    (b) forming a helical fuel flow passage in the tubular wall of the fuel tube such that the fuel flow passage circumferentially wraps around the fuel tube at least once along the axial length of the fuel tube and extends along the majority of the axial length of the fuel tube; and
    (c) providing an elongated tubular sleeve having a central bore defining an inner diameter, the inner diameter being substantially equal to the outer diameter of the fuel tube; and
    (d) positioning the fuel tube within the central bore of the tubular sleeve.

7. The method of claim 6, wherein the step of forming the fuel flow passage in the tubular wall includes machining a helical channel in an outer surface of the tubular wall.

8. The method of claim 6, wherein the steps of providing a fuel tube and forming the fuel flow passage in the tubular wall include casting the fuel tube with an integral helical channel formed in the outer surface of the tubular wall.

9. The method of claim 6, wherein the step of forming the fuel flow passage in the tubular wall includes machining a plurality of axial passages extending a predetermined distance along an axial length of the fuel tube.

10. The method of claim 9, wherein the plurality of axial passages are equidistantly and circumferentially spaced about the central passage of the fuel tube.

11. The method of claim 9, wherein the step of machining the fuel flow passage further comprises machining a central annular channel connecting a plurality of upper axial passages with a plurality of lower axial passages.

12. A feed arm for a multiple circuit fuel injector of a gas turbine engine, the feed arm comprising:
    (a) an elongated tubular sleeve having a central bore with an interior wall defining an inner diameter;
    (b) an elongated fuel tube positioned within the bore of the tubular sleeve, the fuel tube having a tubular wall defining an outer diameter, wherein the outer diameter of the fuel tube is substantially equal to the inner diameter of the central bore;
    (c) a primary fuel flow passage formed in the tubular wall of the fuel tube and bounded by the interior wall of the tubular sleeve, the primary fuel flow passage including a plurality of circumferentially spaced axial channels extending a predetermined distance along the axial length of the fuel tube, wherein the plurality of axial channels includes a plurality of upper axial channels formed in an upper portion of the feed arm and a plurality of lower axial channels formed in a lower portion of the feed arm, the upper and lower axial channels being connected by a central annular channel; and
    (d) a secondary fuel flow passage extending through a central portion of the fuel tube.

13. The feed arm of claim 12, wherein a width of the central annular channel is greater than a width of each of the plurality of axial channels.

14. The feed arm of claim 12, wherein the plurality of axial channels are equidistantly spaced about the central portion of the fuel tube.

* * * * *